(12) United States Patent
Almutairi

(10) Patent No.: US 9,907,985 B2
(45) Date of Patent: Mar. 6, 2018

(54) FIRE RISK DETECTION AND SUPPRESSION IN A MODULAR GAS SUPPLY SYSTEM

(71) Applicant: UMM AL-QURA UNIVERSITY, Makkah (SA)

(72) Inventor: Salem Almutairi, Makkah (SA)

(73) Assignee: Umm Al-Qura University, Makkah (SA)

( * ) Notice: Subject to any disclaimer, the term of this patent is extended or adjusted under 35 U.S.C. 154(b) by 199 days.

(21) Appl. No.: 14/682,935

(22) Filed: Apr. 9, 2015

(65) Prior Publication Data

US 2016/0296779 A1   Oct. 13, 2016

(51) Int. Cl.
| | | |
|---|---|---|
| *A62C 2/12* | (2006.01) | |
| *A62C 3/00* | (2006.01) | |
| *A62C 4/02* | (2006.01) | |
| *A62C 37/12* | (2006.01) | |
| *F16K 17/38* | (2006.01) | |
| *A62C 3/06* | (2006.01) | |
| *A62C 37/38* | (2006.01) | |

(52) U.S. Cl.
CPC .................. *A62C 3/06* (2013.01); *A62C 2/12* (2013.01); *A62C 4/02* (2013.01); *A62C 37/38* (2013.01); *F16K 17/383* (2013.01); *A62C 3/006* (2013.01); *A62C 37/12* (2013.01)

(58) Field of Classification Search
CPC .. A62C 2/04; A62C 2/12; A62C 3/006; A62C 3/06; A62C 4/02; A62C 37/12; A62C 37/38; F16K 17/38; F16K 17/383; F16K 17/386
USPC ........ 169/19, 42, 56, 57, 59, 65; 137/72, 74, 137/75, 78.4–80
See application file for complete search history.

(56) References Cited

U.S. PATENT DOCUMENTS

| | | | | |
|---|---|---|---|---|
| 1,658,099 A | * | 2/1928 | Reardon ............... | F16K 17/383 137/77 |
| 3,473,544 A | * | 10/1969 | Nielsen, Jr. ............ | F16K 13/06 137/75 |
| 3,835,875 A | * | 9/1974 | Morse ................... | F16K 17/386 137/75 |
| 3,889,757 A | | 6/1975 | Dunn | |

(Continued)

FOREIGN PATENT DOCUMENTS

WO          90/06155          6/1990

OTHER PUBLICATIONS

Ralph J. Perry, Inc., "Fire Suppression Systems—Kitchen Hood Fire Suppression Systems," 3 Pages, http://ralphiperryinc.com/?page_id=28.

*Primary Examiner* — Darren W Gorman
(74) *Attorney, Agent, or Firm* — Oblon, McClelland, Maier & Neustadt, L.L.P.

(57) ABSTRACT

A gas pipe terminal assembly for minimization of fire hazards associated with conductance of a flammable substance. The system includes a pipe having a flange at each end. Each flange includes at least one check valve and a flame screen mounted in the interior of the flange to control a gas flow through the flange. The flange includes wire guide holes and set screw holes within the outside diameter of the pipe, and at least one wire segment in tension inside the pipe and connected to at least one fusible link. At least one fusible link is configured to fuse upon exposure to a temperature above 100° C. and thereby release the tension and activate at least one fire suppression device.

20 Claims, 14 Drawing Sheets

(56) References Cited

U.S. PATENT DOCUMENTS

| | | | | |
|---|---|---|---|---|
| 4,488,566 | A | * 12/1984 | Hicks | F16K 17/383 |
| | | | | 137/515.7 |
| 4,524,835 | A | 6/1985 | Mingrone | |
| 4,979,572 | A | * 12/1990 | Mikulec | A62C 3/006 |
| | | | | 137/79 |
| 5,351,760 | A | 10/1994 | Tabor, Jr. | |
| 5,730,170 | A | * 3/1998 | Sanchez | F16K 17/383 |
| | | | | 137/554 |
| 5,871,056 | A | * 2/1999 | Renna | A62C 37/12 |
| | | | | 169/42 |
| 6,279,597 | B1 | * 8/2001 | Schulze | F16K 17/383 |
| | | | | 137/72 |
| 2005/0126797 | A1 | * 6/2005 | Mikulec | A62C 3/006 |
| | | | | 169/65 |
| 2009/0321093 | A1 | * 12/2009 | Lalouz | A62C 3/006 |
| | | | | 169/57 |
| 2012/0048399 | A1 | * 3/2012 | Zellweger | F16K 17/34 |
| | | | | 137/527 |
| 2014/0263680 | A1 | 9/2014 | Jackson, Jr. | |

* cited by examiner

FIRE RISK DETECTION AND SUPPRESSION IN A MODULAR GAS SUPPLY SYSTEM

BACKGROUND

Field of the Disclosure

The present disclosure relates to fire detection and suppression in a gas supply system, generally relating to a modular system of hoses and pipes directly linking a gas source with an oven.

Description of the Related Art

The risk of fire and explosion in a gas oven and its supply lines, and the attendant safety issues, have been addressed by a number of disclosures in the prior art, which includes methods and apparatus for automatic shut off of gas supplies, activation of fire extinguishing apparatus, and shut off of electrical power, where applicable.

However, the distribution of flammable gas leading from a supply line or storage source to an oven, generally for cooking, continues to be a concern due to ongoing occurrences of oven fires.

Failures occur as the result of a wide variety of possibilities, but often arise from either accidents originating from user error or equipment malfunction. In the case of user error, the modes of failure include, for example, operating ovens at excessive temperatures or for prolonged periods of time, and heating of unsuitable or flammable materials inside or near the oven.

Equipment malfunction can occur in a variety of ways including, for example failures and leaks from valves, couplings, and structural failures in storage vessels themselves, with the resultant gas leaks coming into contact with an ignition source. For these reasons it is important that improved methods and apparatus for detection and suppression of fires continue to be developed with the aim of reducing the frequency and severity of such incidents, in a greater variety of gas storage and supply systems.

SUMMARY

In one embodiment, there is provided a gas pipe terminal assembly for minimization of fire hazards associated with conductance of a flammable substance. The assembly has a pipe having a flange at each end. The flange has at least one of a check valve and a flame screen mounted in an interior of the flange to control a gas flow therethrough. The flange has wire guide holes and set screw holes within an outside diameter of the pipe. The assembly includes at least one wire segment in tension inside the pipe and connected to at least one fusible link, and the at least one fusible link is configured to fuse upon exposure to a temperature above 100° C. and thereby release the tension and activate at least one fire suppression device.

In one embodiment, there is provided a system for suppression of fire hazards associated with conductance of a flammable substance. The system includes a first terminal assembly having the gas pipe terminal assembly described above, a hose assembly connected to the first terminal assembly, a second terminal assembly connected to the hose assembly, and a fire extinguisher disposed in a vicinity of at least one of the first terminal assembly, the hose assembly, and the second terminal assembly.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

Figure 1:
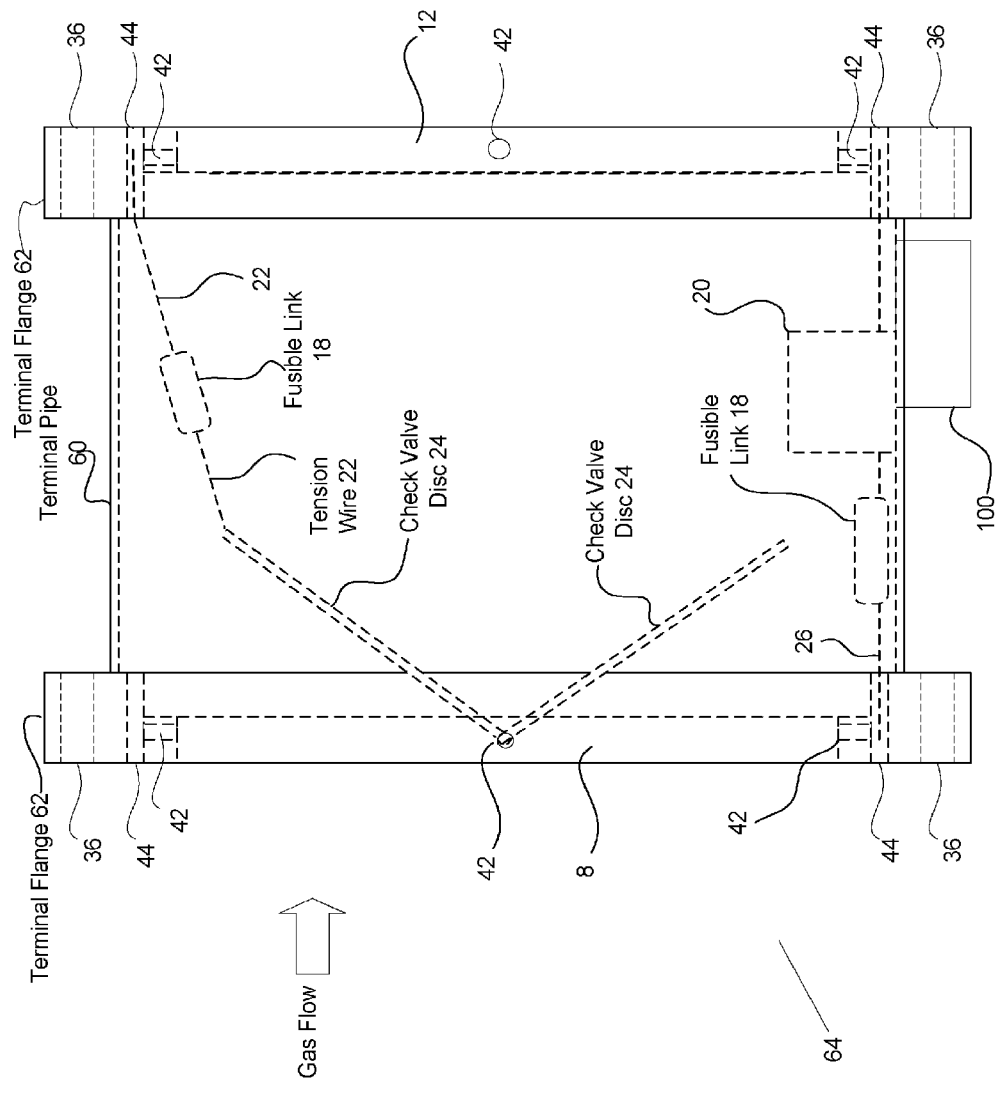
FIG. 1 is a side view of an embodiment of a terminal assembly.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

The present disclosure is directed to the detection and suppression of fires in a modular system of gas hoses and pipes, the system having for example fusible links, check valves, hoses and pipes of various lengths and sizes, fire extinguishers, fire extinguisher switches, and tension wires that together can detect and react to fires at a variety of locations within the system. Further, as used herein, the term "fuse" or "fusing" means to reduce a material to a liquid or plastic state.

Once certain predetermined temperatures are reached at certain locations within the system, a number of automatic fire prevention and suppression actions can occur including, for example, triggering one or more fire extinguishers, and closure of check valves in gas supply lines to isolate sections of the system. Fire prevention and suppression actions can occur in a plurality of sections of the system based on conditions detected in other sections of the system that may not be in direct contact with the sections in which the fire prevention and suppression actions occur.

Further, in the invention, passive fire prevention and suppression measures may also be used including, for example a flame screen to minimize the risk of fires spreading.

Referring now to the drawings, wherein like reference numerals designate identical or corresponding parts throughout the several views.

FIG. 1 is a side view of an embodiment of a terminal assembly 64 having a pair of terminal flanges 62, a terminal pipe 60, a check valve assembly 8 held open by the tension of an assembly of segments of check valve tension wire 22 and a fusible link 18, a fire extinguisher assembly 100 adjacent to a fire extinguisher switch assembly 20 held open by the tension of an assembly of segments of fire extinguisher tension wire 26 and a fusible link 18. Further each terminal flange 62 comprises a plurality of bolt holes 36 and wire guide holes 44, containing a plurality of set screw holes 42. While the depiction in FIG. 1 and many of the drawings below are most readily understood as depicting circular or tubular pipe sections, the flanges and pipes and pipe sections and segments described below need not be limited to circular or tubular pipe sections. In the invention, other closed section constructs configured to contain a fluid, gas, or flammable substance are suitable.

The check valve assembly 8 is preferably located in a terminal flange 62 where gas flow into the terminal assembly 64 and is disposed such that the check valve discs 24 open into the terminal pipe 60 when tension is applied to one of the two check valve discs 24. In one embodiment, a check valve tension wire 22 links the check valve disc 24 with a fusible link 18 to provide tension to keep the check valve disc 24 in an open position, permitting gas to flow into and through the terminal assembly 64. In one embodiment, the other end of the check valve tension wire 22 is disposed inside a wire guide hole 44 and secured to the opposite terminal flange 62 by means of a set screw 28 inside a set screw hole 42.

In one embodiment, tension is maintained between the check valve disc 24 and the opposite terminal flange 62 provided the temperature inside the terminal assembly 64 does not exceed the melting point of the fusible link 18. If the melting point of the fusible link 18 is exceeded, indicating presence of fire, the fusible link 18 will fuse and tension in the check valve tension wire 22 will be lost. The fusible link can in some cases fuse or separate prior to melting or complete melting of the wire. In this case, regardless of the fusing mechanism, the check valve disc 24 will spring shut against the check valve body 10 (FIG. 2) of the check valve assembly 8 and close terminal assembly 64 to gas flow and prevent additional fuel from reaching the fire.

Another fusible link 18, which may or may not be of the same melting point as the fusible link 18 connected to the check valve disc 24, can be disposed between the fire extinguisher switch assembly 20 and another wire guide hole 44 through a fire extinguisher tension wire 26. Tension in this example also prevents the fire extinguisher switch assembly 20 from activating or triggering the fire extinguisher assembly 100.

Tension in fire extinguisher tension wire 26 is maintained by inserting one end of each segment of the fire extinguisher tension wire 26 into a wire guide hole 44 in each terminal flange 62 and securing each end of fire extinguisher tension wire 26 with a set screw 28 inside of the set screw hole 42.

In one embodiment, each terminal flange 62 of a terminal assembly 64 is directly attached to another flange whether a terminal flange 62, a hose flange 4 or other similar flange, by aligning the bolt holes 36 on each terminal flange 62 with the bolt holes 36 on each flange of any apparatus to which it is directly connected.

In one embodiment, each wire guide hole 44 on the terminal flange 62 of the terminal assembly 64 is located within the inner diameter of the terminal pipe 60 such that a check valve tension wire 22 or a fire extinguisher tension wire 26 can be routed through the terminal flange 62 and into other apparatus such as for attachment to a check valve assembly 8 or fire extinguisher switch assembly 20, or other component of an assembly, enabling mechanical sensing and switching within different locations of an assembly or system of hoses, pipes, housings, and valves.

In one embodiment, each check valve assembly 8 is disposed inside of a terminal flange 62 in the direction of gas flow along the longitudinal axis of the terminal assembly 64 and may be secured by, for example, a plurality of set screws 28 inside of set screw holes 42 arranged circumferentially within the terminal flange 62.

In one embodiment, each flame screen 12 is disposed inside a terminal flange 62 in the direction of gas flow along the longitudinal axis of terminal assembly 64 and may, for example, be secured by a plurality of set screws 28 inside of set screw holes 42 arranged circumferentially within the terminal flange 62. The flame screen 12 is preferably located such that if there is a fire inside the terminal assembly 64 it will reduce the rate at which flames can migrate from the terminal assembly 64 to the next, directly connected component or apparatus is the system or assembly.

Figure 2:
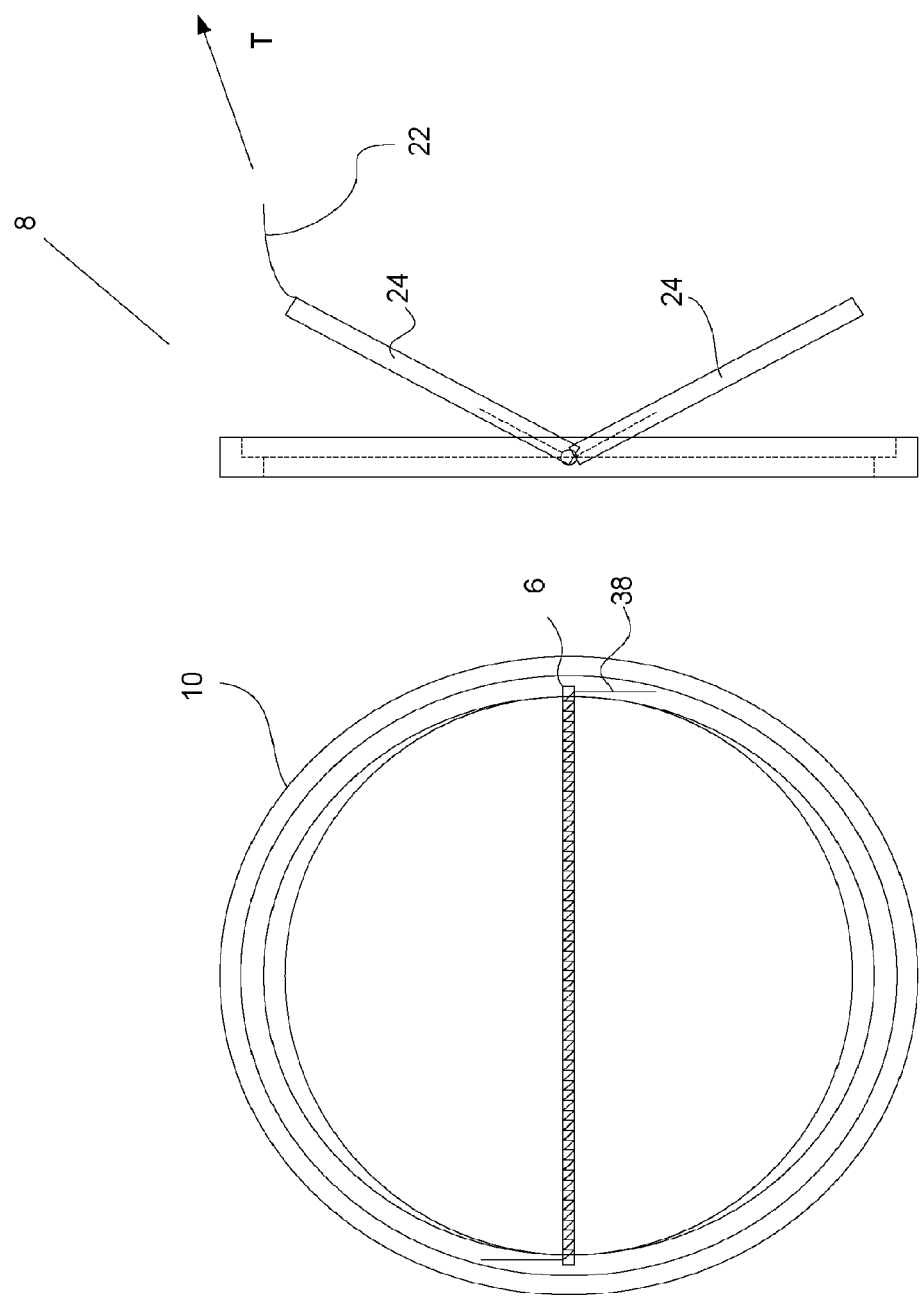
FIG. 2 is a front and side view of an embodiment of a check valve assembly.

FIG. 2 is a front and side view of an embodiment of a check valve assembly 8, having a check valve shaft 6, a check valve body 10, two semi-circular check valve discs 24, and a check valve torsion spring 38. The check valve discs 24 in this embodiment are disposed with their flat edges about the check valve shaft 6 wherein the pair of check valve discs 24 forms a circular shape when supported on a flat surface. A check valve torsion spring 38 disposed around the check valve shaft 6 and provides tension by applying an equal force to each check valve disc 24 keeps the discs open in a flat position relative to one common plane. The check valve shaft 6 is affixed to the check valve body 10 with the check valve shaft 6 disposed across the inner diameter of the check valve body 10, the check valve discs 24 form a circle and mount flush with the 10.

Because the check valve discs 24 are mounted on the same check valve torsion spring 38 the discs always rotate proportionally and in opposite directions when tension is applied to one or both check valve discs 24. The check valve discs 24 are pushed open uniformly in opposite directions when tension on one of the check valve discs 24 exceeds the torsion of check valve torsion spring 38.

Furthermore when tension on the check valve disc 24 is reduced below the force needed to overcome that applied by check valve torsion spring 38 on the check valve disc 24, the check valve discs 24 will snap shut against the edge of the check valve body 10 and prevent gas flow.

In this embodiment, the check valve tension wire 22 is affixed to a check valve disc 24 on the side facing away from the check valve body 10 by, for example, soldering mechanical fasteners or other means of attachment. When a tension is applied that overcomes the force of the check valve torsion spring 38, the check valve assembly 8 remains open. The check valve assembly 8 is preferably mounted coaxially inside any terminal flange 62 and is secured by, in this example, a plurality of set screws 28 inside set screw holes 42, with its check valve disc 24 positioned to open into the tube, hose or pipe if disposed on the inlet end of a terminal assembly 64, and with the check valve disc 24 positioned to open outwardly from the terminal assembly 64 if disposed on the exit end of a terminal assembly 64.

Figure 3:
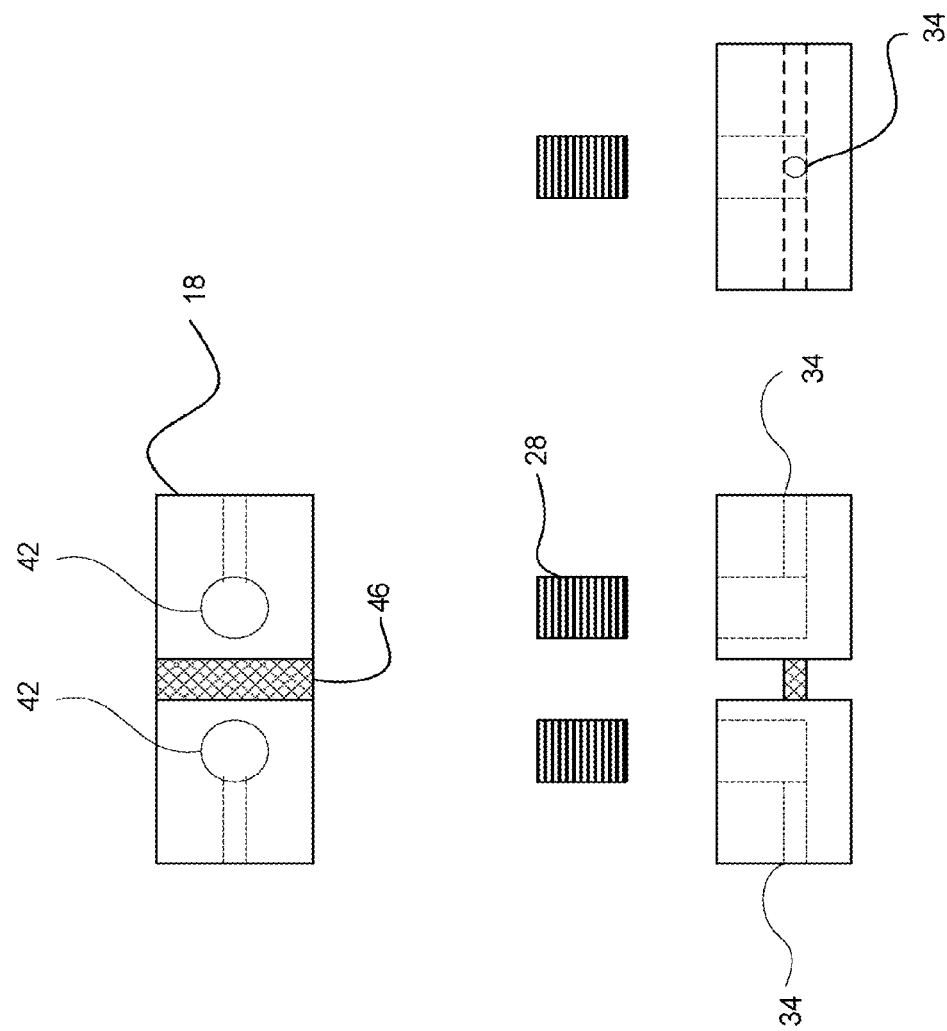
FIG. 3 is a plan, side and front view of an embodiment of a fusible link.

FIG. 3 is a plan, side, and front view of an embodiment of a fusible link 18 comprising two 34, two set screw holes 42 and a fuse section 46. Also shown are two set screws 28 that are used to secure wires to the fusible link 18. In this embodiment, two parts of a wire are joined by the fusible link 18 wherein the end of a check valve tension wire 22 or fire extinguisher tension wire 26 is inserted into each tension wire hole 34 and secured with a set screw 28 threaded into a 42. Tightening the set screws 28 applies a pressure to the check valve tension wire 22 or fire extinguisher tension wire 26, clamping the wire end to the 18. Repeating that process with a separate check valve tension wire 22 or fire extinguisher tension wire 26 on the opposite end of the fusible link 18 joins two separate check valve tension wire 22 or fire extinguisher tension wire 26 into one unit.

This permits tension to be applied between any two wire segments as if they were one unit. While tension is maintained in the check valve tension wire 22 and fire extinguisher tension wire 26 affixed to the 18, conditions within the hose or pipe assembly remain steady state. However, if the fuse section 46 is under tension and breaks by, for example, temperature conditions above the predetermined limit, the tension is lost, and the system can experience a dynamic change, for example, such as the closing of one or more check valve assembly 8 or triggering of one or more fire extinguisher switch assemblies 20, depending on the number of connections in the entire system or assembly using check valve tension wires 22 and fire extinguisher tension wires 26.

The fusible link 18 can be formed from a variety of metal alloys with varying and distinct melting points. In all embodiments the fusible links 18 are formed from materials having lower melting temperatures than the melting temperatures of the respective check valve tension wires 22 and the fire extinguisher tension wires 26 which they are connected.

In one embodiment, the fusible link 18 is formed from a brass alloy with a melting point of 74° C. In another embodiment, the fusible link 18 is formed from a stainless steel alloy with a melting point of 260° C. In another embodiment, the fusible link 18 is formed from a bronze alloy with a melting point of 138° C.

Figure 4:
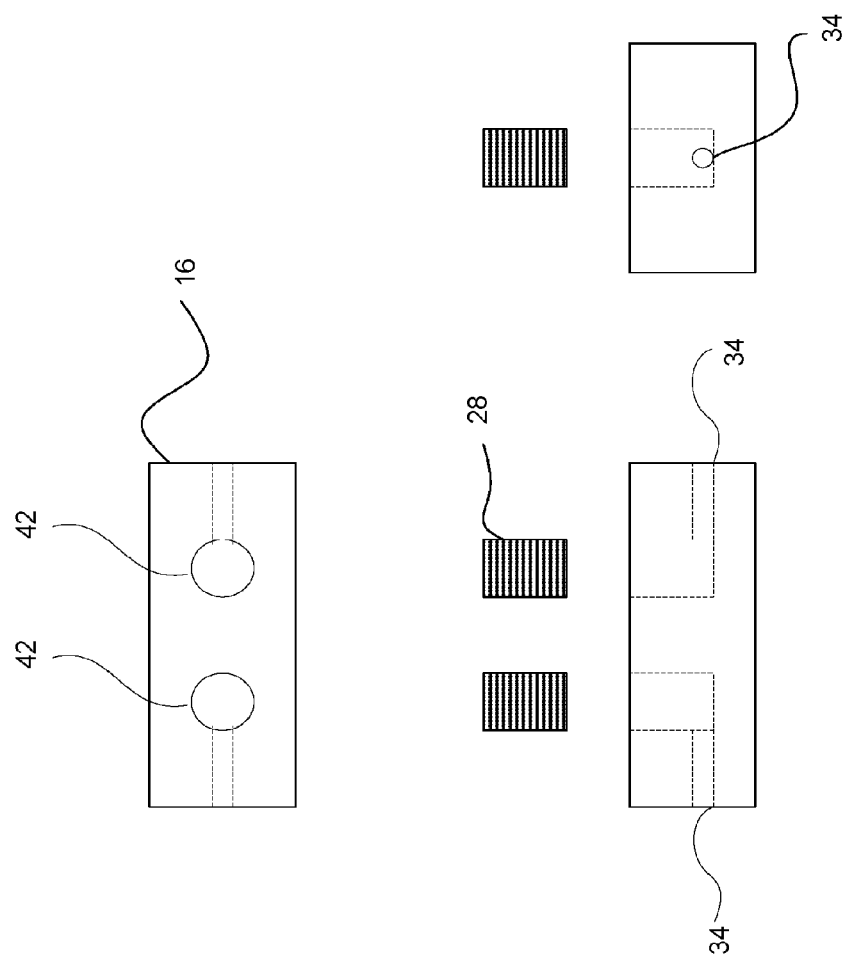
FIG. 4 is a plan, side and front view of an embodiment of a wire clamp.

FIG. 4 is a plan, side, and front view of an embodiment of a wire clamp 16 comprising two tension wire holes 34 and two sec screw holes 42. FIG. 3 also shows two set screws 28 that are used to secure wires to the wire clamp 16. In this embodiment, two separate wire ends are joined by the wire clamp 16 wherein the end of a check valve tension wire 22 or fire extinguisher tension wire 26 is inserted into each tension wire hole 34 and secured with a set screw 28 threaded into a set screw hole 42. Tightening the set screw 28 applies a pressure to the check valve tension wire 22 or fire extinguisher tension wire 26, clamping the wire end to the wire clamp 16. Repeating that process with the separate check valve tension wire 22 or the fire extinguisher tension wire 26 on the opposite end of the wire clamp 16 joins two separate check valve tension wires 22 or fire extinguisher tension wires 26 into one unit. This construction makes it easier to install and adjust the tension in check valve tension wire 22 and fire extinguisher tension wire 26 assemblies across multiple pipe or hose sections and assemblies by cutting and clamping as needed.

Figure 5:
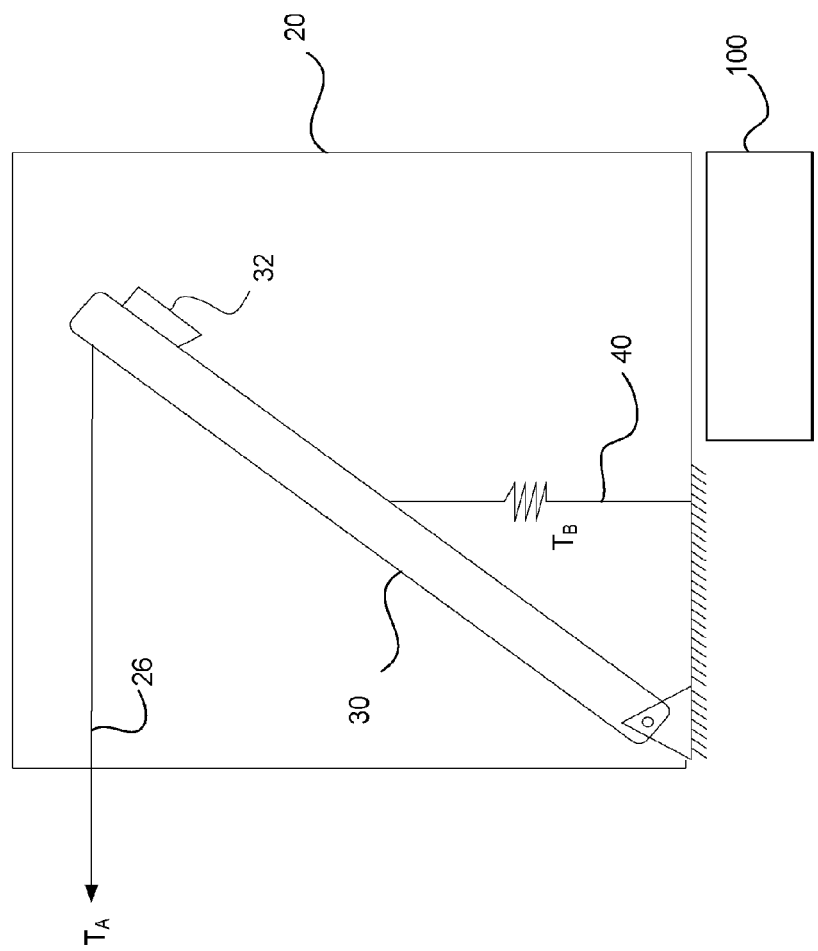
FIG. 5 is a diagram of an embodiment of a fire extinguisher switch assembly.

FIG. 5 is a diagram of an embodiment of a fire extinguisher switch assembly 20, comprising a pivoting switch lever 30 and a switch striker 32 affixed near one end. In this embodiment, tension is provided by the tension spring 40 and the fire extinguisher tension wire 26, which each provide an equal and opposite torque about the fulcrum of the switch lever 30. If the tension $T_A$ in fire extinguisher tension wire 26 is lost, for example by the fusing of fuse section 46 (FIG. 1), tension $T_B$ will result in the switch striker 32 striking 100, which will release the fire suppressant contained within fire extinguisher assembly 100 (FIG. 6).

Figure 6:
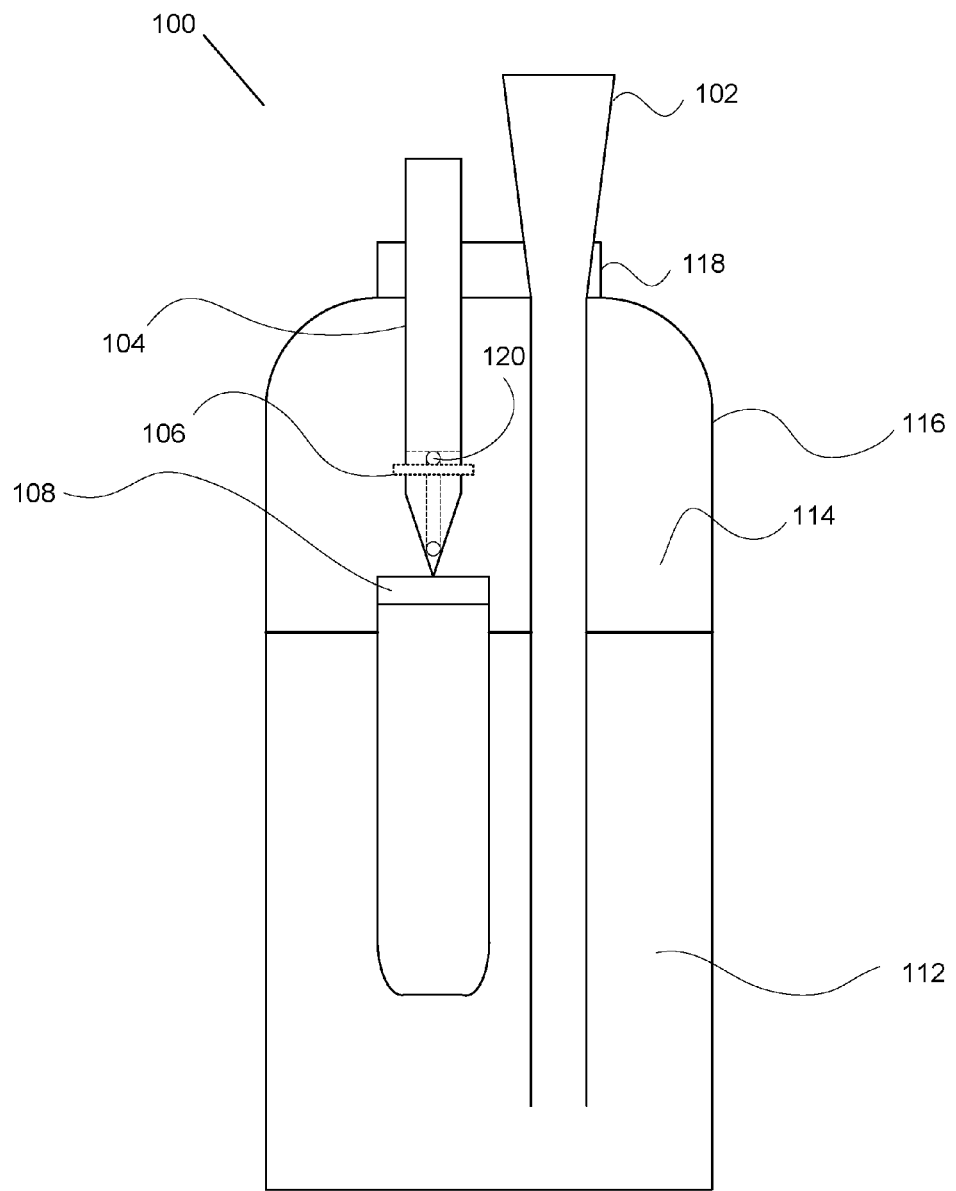
FIG. 6 is a diagram of an embodiment of a fire extinguisher assembly.

FIG. 6 is a diagram of an embodiment of a fire extinguisher assembly 100. In this embodiment, the fire extinguisher assembly 100 is secured to a terminal assembly 64 by a fire extinguisher mounting collar 118 and disposed adjacent to a fire extinguisher switch assembly 20 such that when triggered the switch striker 32 (FIG. 5) would strike a fire extinguisher rod 104 of the fire extinguisher assembly 100. In this embodiment, the fire extinguisher rod 104 is displaced some distance, up to a maximum where a fire extinguisher rod stop 106 is in contact with the fire extinguisher cartridge membrane 108, the tip of the fire extinguisher rod 104 puncturing the fire extinguisher cartridge membrane 108, and the bottom tip of the rod tube 120 is inside the fire extinguisher pressure cartridge membrane 108 while the upper holes of the rod tube 120 remain within the fire extinguisher air space 114 of the fire extinguisher tank 116. The rod tube 120 thus serves as a conduit between the fire extinguisher pressure cartridge membrane 108 and 114.

The contents of the pressurized fire extinguisher pressure cartridge membrane 108 rapidly flow up the rod tube 120 into the 114. Pressure forces fire suppressant 112 up the fire extinguisher nozzle 102. Fire suppressant is thus discharged into the terminal assembly 64 until the internal pressures of the fire extinguisher air space 114 and terminal assembly 64 reach equilibrium.

Figure 7:
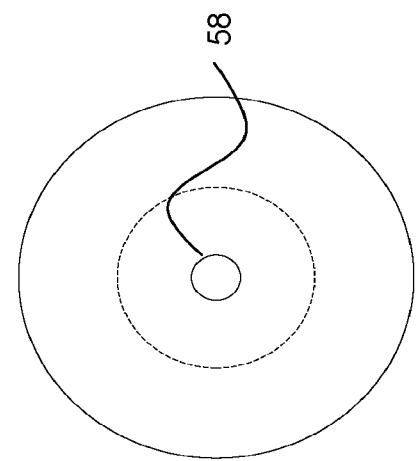
FIG. 7 is a side and front view of an embodiment of a tension wire guide cap.
Figure 7:
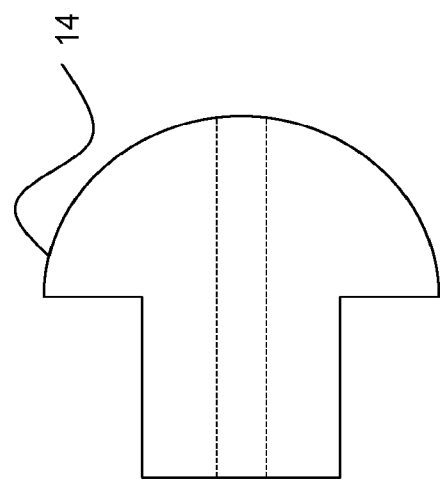

FIG. 7 is a side and front view of an embodiment of a tension wire guide cap 14. In this embodiment, the tension wire guide cap 14 fits inside the wire guide hole 44 of flanges such as those of a hose flange 4 and a terminal flange 62, and seals the interior of the hoses or pipes the flanges are attached to from the outside elements in cases where the flange interface between two flanges, leaves at least one interior segment of the resulting assembly exposed to the outside atmosphere due the presence of a wire guide hole 44, for example where the wire guide hole 44 on one flange leads into the interior of a hose or pipe while the wire guide hole 44 on the mating flange is located outside the diameter of the hose or pipe it is affixed to, such as the case when a terminal assembly 64 is affixed to a hose assembly 1.

In one embodiment the tension wire guide cap 14 has a wire guide cap hole 58 that runs through the length of the part. In this embodiment, this wire guide cap hole 58 permits a check valve tension wire 22 or fire extinguisher tension wire 26 to be routed from inside a hose or assembly, for example, a hose assembly 1 or a terminal assembly 64 through the tension wire guide cap 14 and, for example, through another tension wire guide cap 14 and back inside another hose assembly 1 or terminal assembly 64.

Figure 8:
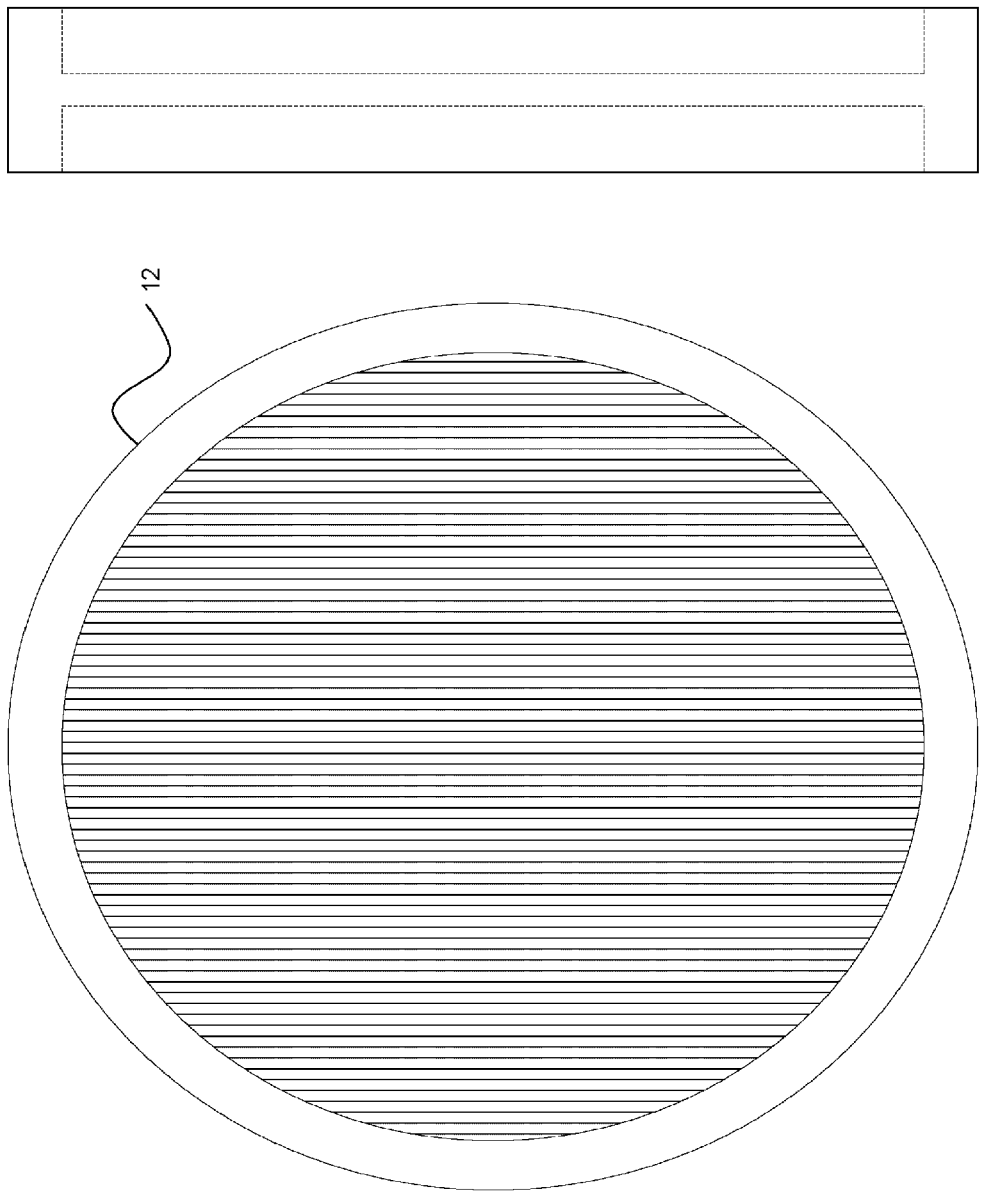
FIG. 8 is a front and side view of an embodiment of a flame screen.

FIG. 8 is a front and side view of an embodiment of a flame screen 12. In this embodiment, the flame screen 12 has a round collar with strips of material disposed across the opening to allow air and gases to pass through but to hinder flame migration between two adjacent sections of a pipe or hose assembly.

The flame screen 12 is an addition to an embodiment of the terminal assembly 64 and fits into the terminal flange 62, where it is secured by, in this example, a plurality of set screws 28 inside set screw holes 42 disposed around the circumference of the terminal flange 62.

Figure 9:
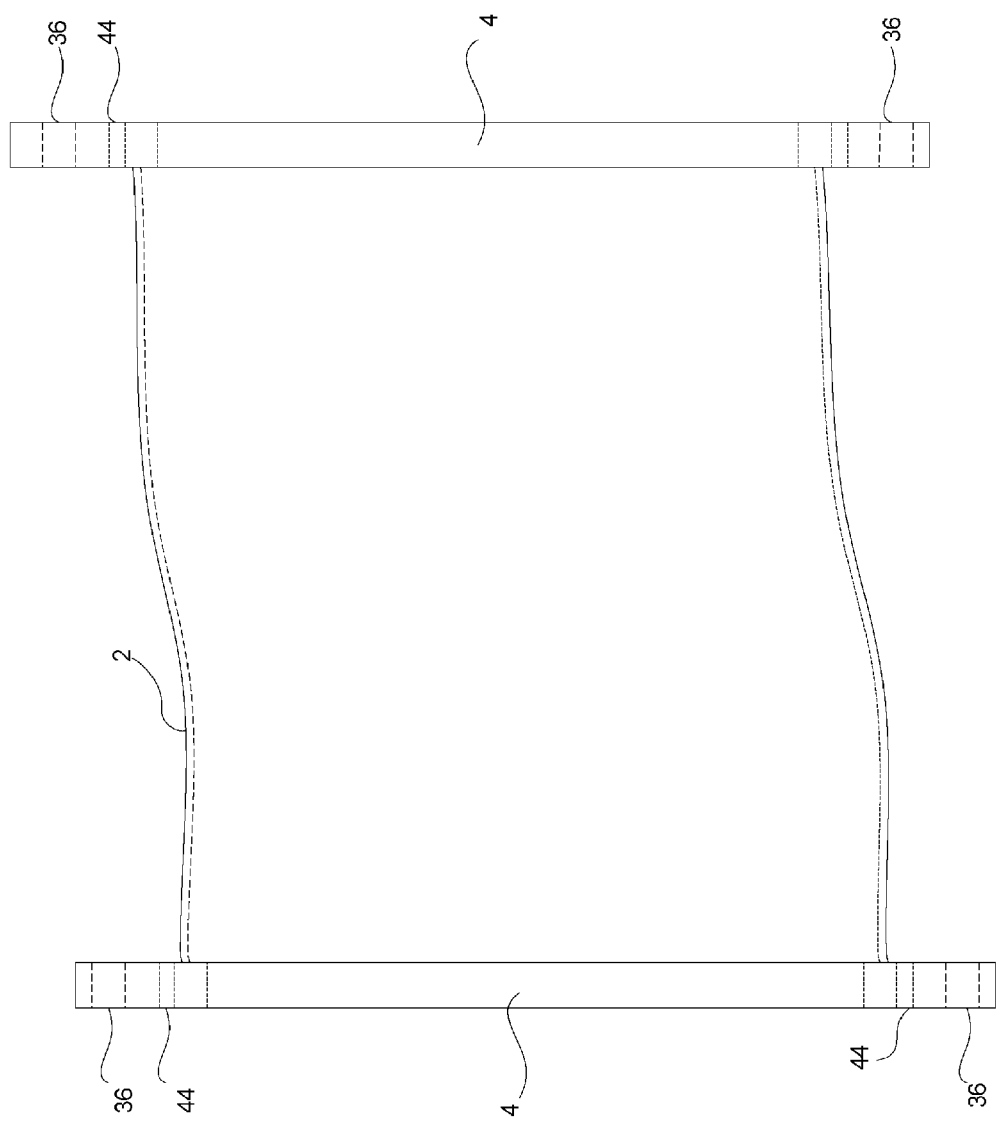
FIG. 9 is a side view of an embodiment of a hose assembly.

FIG. 9 is a side view of an embodiment of a hose assembly 1 comprising a section of hose 2 with a hose flange 4 disposed at each end. In this embodiment, each hose flange 4 comprises a plurality of bolt holes 36 and wire guide holes 44, and a through diameter substantially the size of the hose 2 it is attached to, allowing material to flow clearly through. In this embodiment, the hose 2 is flexible while other embodiments of hose assembly 1 may contain a rigid tube in place of hose 2. The hose flange 4 at each end is fastened to a corresponding flange on other sections of pipes or hoses as part of a larger gas line assembly by, for example, securing two mating flanges together by aligning the flanges and tightening nuts and bolts using the bolt holes 36.

In this embodiment, other components equipped with mating surfaces suitable for securement to the hose flange 4 include butterfly valve assembly 50 and terminal flange 62. Furthermore, the wire guide hole 44 in each hose flange 4 can be located outside the diameter of the hose 2 and through diameter of the hose flange 4. This permits for any check valve tension wire 22 or fire extinguisher tension wire 26 to be guided through the hose flange 4 and external to the inside of the 2, providing access to the check valve tension wire 22 or fire extinguisher tension wire 26 for assembly, installation, inspection and maintenance. This also permits a more direct path for any assembly of check valve tension wires 22 or fire extinguisher tension wires 26 to connect different pipe or hose assembly 1, even if the path of the pipe or hose assembly 1 curves and turns.

When a hose flange 4 is affixed to a terminal flange 62, the interior or the terminal assembly 64 is exposed to the atmosphere by way of the wire guide holes 44 on both the hose flange 4 and the terminal flange 62. A solid tension wire guide cap 14 without a wire guide cap hole 58 may be inserted into each wire guide hole 44 on the hose flange 4 to isolate the internal volume of the terminal assembly 64 from the outside environment once the system is assembled. Each tension wire guide cap 14 may be equipped with a wire guide cap hole 58 if a check valve tension wire 22 or fire extinguisher tension wire 26 is routed through the tension wire guide cap 14 for a particular wire guide hole 44 and then to a terminal outside the pipe or hose assembly 1 or section.

Figure 10A:
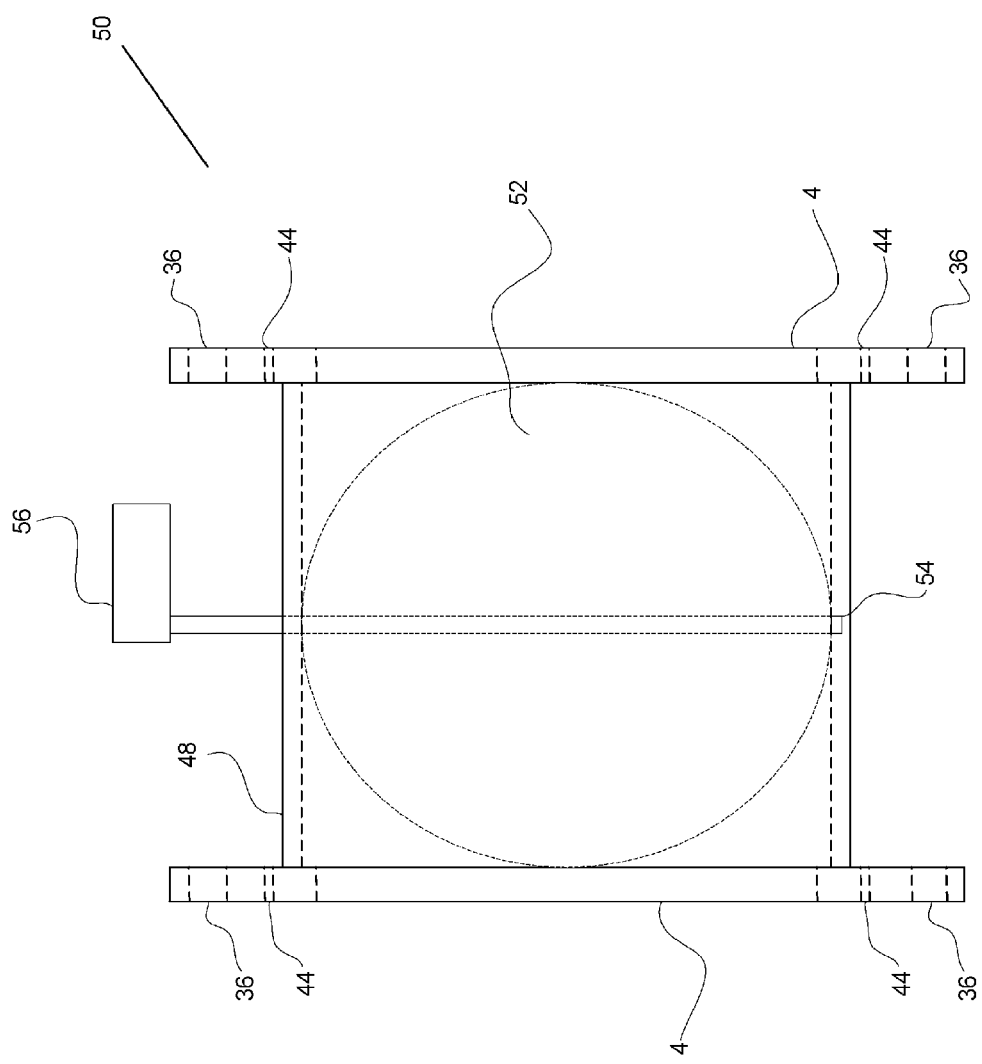
FIG. 10A is a side view of an embodiment of a butterfly valve assembly in the open position.

FIG. 10A is a side view of an embodiment of a butterfly valve assembly 50 in the open position, permitting material to flow from one side through the other. In this embodiment butterfly valve assembly 50 comprises a butterfly valve housing 48 secured to one hose flange 4 at each end along the longitudinal axis.

Along its length is a butterfly valve disc 52 disposed on a butterfly valve shaft 54 that is orthogonal to the longitudinal axis of the butterfly valve housing 48. In this embodiment, the butterfly valve shaft 54 protrudes through the wall of the butterfly valve housing 48 and attaches to a butterfly valve handle 56 that is used to adjust the position of 52. Thus the butterfly valve disc 52 pivots about the axis of butterfly valve shaft 54 and serves to open and close the body of the hose assembly.

Figure 10B:
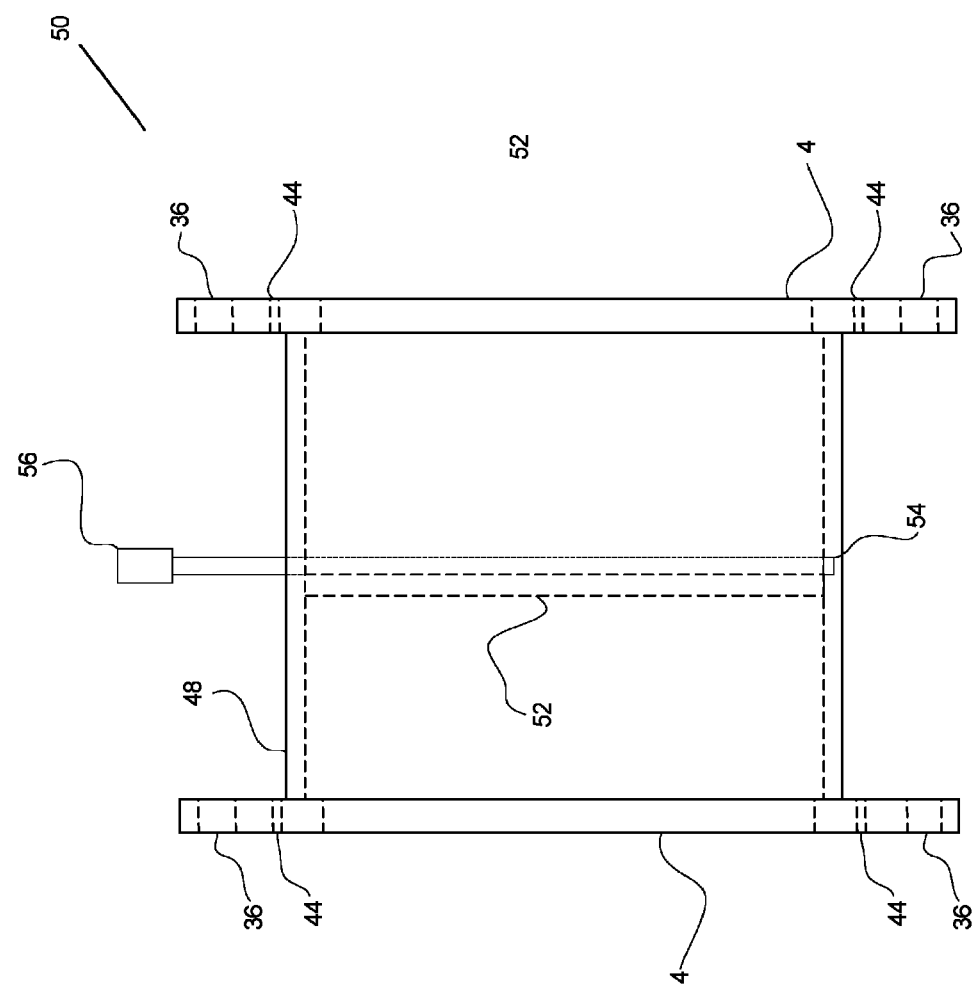
FIG. 10B is a side view of an embodiment of a butterfly valve assembly in the closed position.

FIG. 10B is a side view of an embodiment of a butterfly valve assembly 50 in the closed position, with the butterfly valve disc 52 orthogonal to gas flow within the pipe or hose. It is otherwise identical to the butterfly valve assembly 50 unit shown in FIG. 10A.

Figure 11:
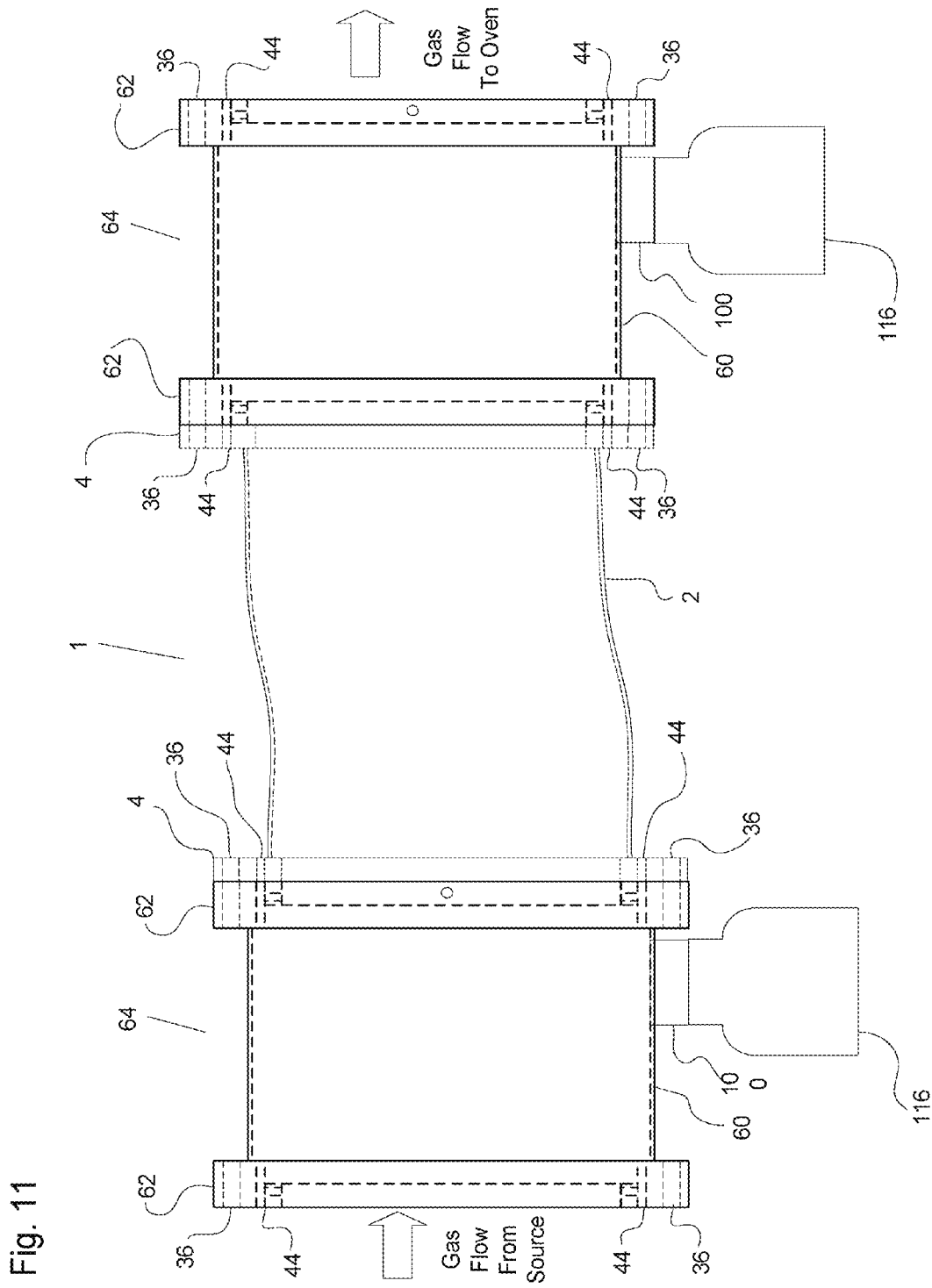
FIG. 11 is a diagram of a two terminal assemblies, each equipped with a fire extinguisher assembly, joined by a hose assembly.

FIG. 11 is a diagram of an embodiment of a gas delivery system having two terminal assemblies 64 joined by a hose assembly 1. The internal operation of the terminal assemblies 64 are described above (FIG. 1). Each terminal assembly 64 has one terminal flange 62 on each end of a terminal pipe 60. The hose assembly 1 has one hose flange 4 disposed on each end of a hose 2. Each terminal flange 62 and each hose flange 4 contains a plurality of identically sized and located bolt holes 36 and wire guide holes 44, permitting the flanges to be secured together using standard fasteners such as bolts, screws, clamps, and/or dowels.

The diameter of the hose 2 is contained within the distance between the wire guide holes 44 on the hose flange 4. The diameter of the terminal pipes 60 is larger than the distance between the wire guide holes 44 on the terminal flange 62, wherein a check valve tension wire 26 or a fire extinguisher tension wire 26 can be routed from within the terminal pipes 60, through a wire guide hole 44 through terminal flanges 62 and hose flanges 4 to the outside of the assembly. Conversely, tension wires can be routed into terminal assemblies 64 from the outside through wire guide holes 44 on said types of flanges. This permits mechanical connections between component assemblies within a system of terminal assemblies 64 and hoses 2 by the check valve tension wires 22 and/or the fire extinguisher tension wires 26, regardless of whether the hoses 2 and terminal pipes 60 are rigid or flexible, and regardless of whether the hoses and pipes are straight or contain bends.

Furthermore, in one embodiment, each terminal assembly 64 is connected to a fire extinguisher assembly 100, which contains a fire extinguisher tank 116.

Figure 12:
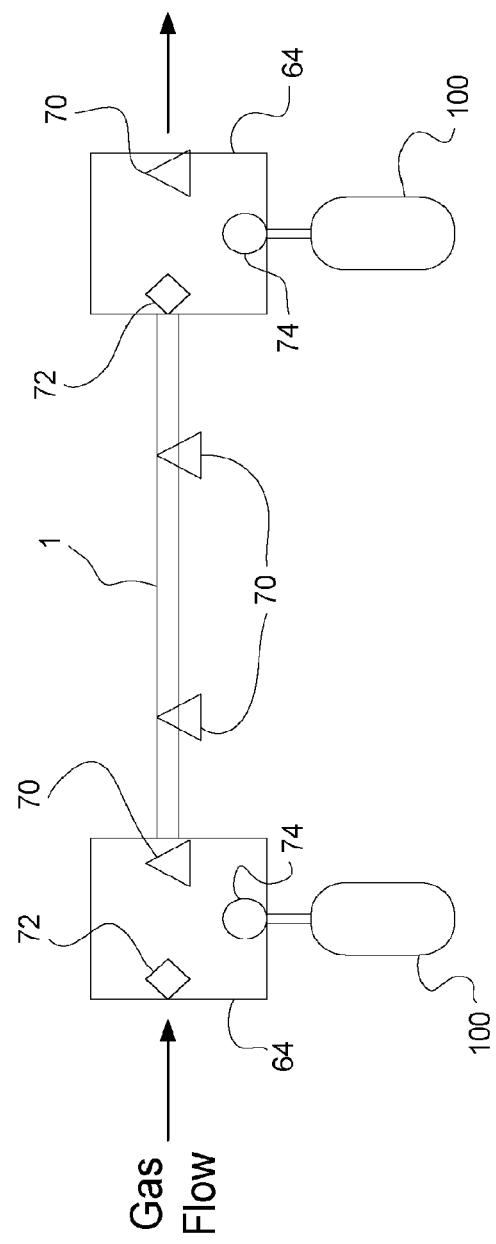
FIG. 12 is a schematic of one embodiment with electronic sensors.

FIG. 12 is a schematic of one embodiment of a system having two terminal assemblies 64 connected to each end of a hose assembly 1.

Each terminal assembly 64 in this embodiment is connected to at least one check valve sensor 72 to monitor the status of the check valve assembly 8 located inside said terminal assembly 64, at least one fire extinguisher sensor 74 to monitor the fire extinguisher assembly 100 connected to the terminal assembly 64, and at least one temperature sensor 70 to monitor the temperature inside the terminal assembly 64.

Further, the hose assembly 1 may contain at least one temperature sensor 70 to monitor the temperature inside the hose assembly 1.

The check valve sensors 72, fire extinguisher sensors 74, and the temperature sensors 70 described above provide further operational data of the system and electronically and wirelessly provide data to a computer system 1201 (described below).

Figure 13:
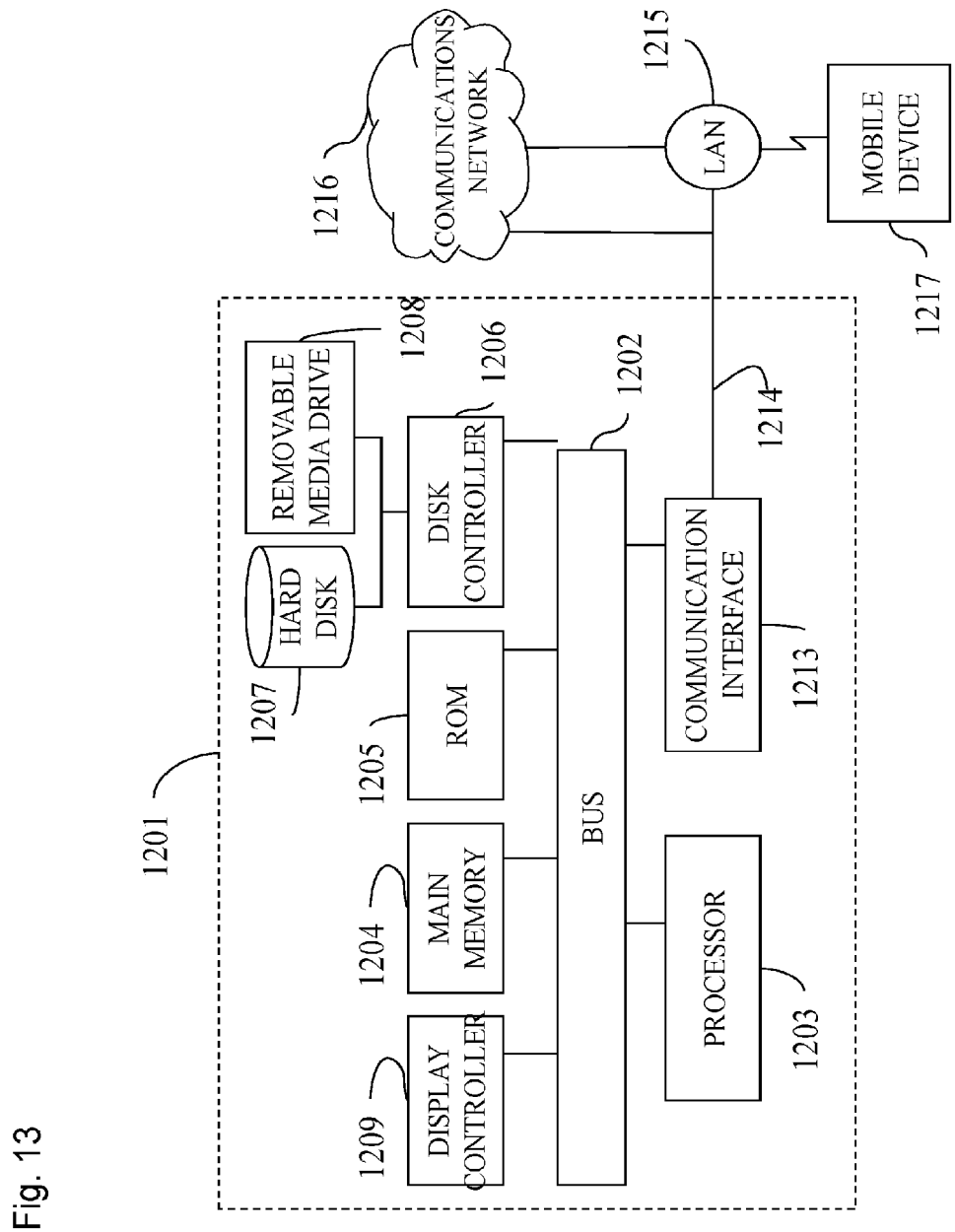
FIG. 13 is a schematic depicting an exemplary computer system for monitoring and notification of fire hazards.

FIG. 13 illustrates one embodiment of a computer system 1201 (e.g. a computer processor) in which the status of the system described above, including system temperatures and operational status of the check valve assemblies 8 and fire extinguisher assemblies 100, are monitored and reported. The computer system 1201 is programmed and/or configured to perform any or all of the functions described above. Further, respective functions can be divided among different computers associated with the fire suppression system and/or in communication with computers near the fire suppression system or in remote locations. These computers may be in communication with each other via the communications network 1216 (discussed below).

The computer system 1201 monitors the status of the check valve assemblies 8 and/or the fire extinguisher assemblies 100 and/or temperature sensors 70 within the system to detect fire risk by way sensors on these components in communication with the system 1201.

Upon detection of fire risk, the system responses include one or more of the closure of one or more check valve assemblies 8, activation of one or more fire extinguisher assemblies 100, detection of temperature sensor 70 readings above a predetermined threshold temperature, for example 100° C., or detection of a relative temperature sensor 70 reading greater than a predetermined delta between two or more temperature sensors 70.

If a fire risk is detected the computer system 1201 is programmed to perform at least one of the following:
(1) Notify local emergency response personnel of the fire risk, (2) activate fire alarms and/or sprinkler systems, and/or (3) provide mobile alerts to designated parties. For example programmed system can alert emergency response personnel of fire, activate fire alarms, activate sprinklers, provide mobile alerts to designated parties if the status of a fire extinguisher changes to release fire suppressant, and provide mobile alerts to designated parties if the status of a check valve changes Further, when such fire risk is detected the computer system 1201 can alert emergency response personnel by displaying a warning on a display controller 1209. Further, temperature sensor 70, check valve sensor 72, and/or fire extinguisher sensor 74 data can be recorded to a disk controller 1206.

The computer system 1201 includes a bus 1202 or other communication mechanism for communicating information, and an internal processor 1203 coupled with the bus 1202 for processing the information. The computer system 1201 includes a memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by the internal processor 1203. In addition, the memory 1204 may be used for storing temporary variables or other intermediate information during the execution of instructions by the internal processor 1203. The computer system 1201 preferably includes a non-volatile memory such as for example a read only memory (ROM) 1205 or other static storage device (e.g., programmable ROM (PROM), erasable PROM (EPROM), and electrically erasable PROM (EEPROM)) coupled to the bus 1202 for storing static information and instructions for the internal processor 1203.

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)). The computer system may also include one or more digital signal processors (DSPs) such as the TMS320 series of chips from Texas Instruments, the DSP56000, DSP56100, DSP56300, DSP56600, and DSP96000 series of chips from Motorola, the DSP1600 and DSP3200 series from Lucent Technologies or the ADSP2100 and ADSP21000 series from Analog Devices. Other processors especially designed to process analog signals that have been converted to the digital domain may also be used (as detailed in the working example below).

The computer system 1201 performs a portion or all of the processing steps of the invention in response to the internal processor 1203 executing one or more sequences of one or more instructions contained in a memory, such as the main memory 1204. Such instructions may be read into the main memory 1204 from another computer readable medium, such as a hard disk 1207 or a removable media drive 1208. Such instructions may be read into the main memory 1204 from another computer readable medium, such as a USB flash drives or jump drives. Such drives are solid-state memory devices which have the ability to act as floppy disks or hard drives under most computer operating systems. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media suitable for the invention are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, or any other medium from which a computer can read.

Stored on any one or on a combination of computer readable media, the invention includes software for controlling the computer system 1201, for driving a device or devices for implementing the invention, and for enabling the computer system 1201 to interact with a human user (e.g., a driver). Such software may include, but is not limited to, device drivers, operating systems, development tools, and applications software. Such computer readable media further includes the computer program product of the invention for performing all or a portion (if processing is distributed) of the processing performed in implementing the invention. The computer code devices of the invention may be any interpretable or executable code mechanism, including but not limited to scripts, interpretable programs, dynamic link libraries (DLLs), Java classes, and complete executable programs. Moreover, parts of the processing of the invention may be distributed for better performance, reliability, and/or cost.

The term "computer readable medium" as used herein refers to any medium that participates in providing instructions to the internal processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

The computer system 1201 also includes a communication interface 1213 coupled to the bus 1202. The communication interface 1213 provides a two-way data communication for example to wireless transmission unit 30 for coupling to a radio or mobile network, or to a network link 1214 that is connected at least temporarily to, for example, a local area network (LAN) 1215, or to another communications network 1216 such as the Internet during downloading of software to the processor 24 or an internal network between multiple computers on board the vehicle. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. In any such implementation, the communication interface 1213 sends and receives electrical, electromagnetic or optical signals that carry digital data streams representing various types of information.

The network link 1214 typically provides data communication through one or more networks to other data devices to provide the data exchange noted above. For example, the network link 1214 may provide a temporary connection to another computer through a local network 1215 (e.g., a LAN) or through equipment operated by a service provider, which provides communication services through a communications network 1216. As shown in FIG. 13, the computing system 1201 can be in communication with a mobile$_{[DHN1]}$ device 1217 via the local network 1215 and the communications network 1216 which use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213.

GENERALIZED STATEMENTS OF THE INVENTION

The following numbered statements provide a general description of the invention and are not intended to limit the appended claims.

(1) A gas pipe terminal assembly for minimization of fire hazards associated with conductance of a flammable substance, the assembly including a pipe having a flange at each end, the flange having at least one of a check valve and a flame screen mounted in an interior of the flange to control a gas flow therethrough, the flange having wire guide holes and set screw holes within an outside diameter of the pipe, at least one wire segment in tension inside said pipe and connected to at least one fusible link and the at least one fusible link configured to fuse upon exposure to a temperature above 100° C. and thereby release the tension and activate at least one fire suppression device.

As an alternative or in supplementation to statement (1), (1 a) a gas terminal assembly for minimization of fire hazards associated with conductance of a flammable substance, the assembly including a conduit having at least one of a check valve mounted in an interior of the assembly to control a substance flow therethrough, the assembly having wire guides and tensioning apparatus, at least one wire segment in tension inside said conduit and connected to at least one fusible link, the at least one fusible link configured to fuse upon exposure to a predetermined temperature and thereby release the tension and activate at least one fire suppression device.

As an alternative or in supplementation to statement (1), (1b) a gas terminal assembly for minimization of fire hazards associated with conductance of a flammable substance, the assembly including a conduit controlling a substance flow therethrough, the assembly having at least one tensioned element inside the conduit. The tensioned element is configured (upon exposure to a predetermined temperature) to release a tension thereof and activate at least one fire suppression device.

(2) The apparatus of (1), further comprising the at least one fusible link located inside said pipe, wherein the fusing of the fusible link activates said check valve as said fire suppression device.

(3) The apparatus of (1), further comprising: a fire extinguisher connected to the inside of said pipe; and the at least one fusible link located inside said pipe, wherein the fusing of the fusible link activates the fire extinguisher as the fire suppression device.

(4) The apparatus of (3), further comprising: said at least one fusible link located inside said pipe, wherein the fusing of the fusible link activates at least one of said check valve and said fire extinguisher.

(5) The apparatus of (4), wherein the at least one fusible link comprises plural fusible links and the fusible links have equal melting temperatures.

(6) The apparatus of (4), wherein the at least one fusible link comprises plural fusible links and the fusible links have different melting temperatures.

(7) The apparatus of (1), further comprising: at least one fusible link located inside said pipe, wherein the fusing of the fusible link activates at least one of said check valve and a fire extinguisher disposed outside the pipe.

(8) The apparatus of (1), further comprising: wire clamps securing the wire segments to each other, and set screws securing the wire segments to at least one of the flanges.

(9) The apparatus of (1), further comprising: wire guide caps sealing the wire guide holes or sealing wire segments passing therethrough.

(10) The apparatus of (1), wherein the fusible link comprises at least one of brass, bronze, and stainless steel alloys.

(11) A system for suppression of fire hazards associated with conductance of a flammable substance, comprising: a first terminal assembly comprising the gas pipe terminal assembly of (1), a hose assembly connected to said first terminal assembly, a second terminal assembly connected to said hose assembly, and a fire extinguisher disposed in a vicinity of at least one of the first terminal assembly, the hose assembly, and the second terminal assembly.

(12) The system of (11), further comprising:
said at least one fusible link located outside said hose assembly, wherein the fusing of the fusible link activates said check valve.

(13) The system of (11), further comprising: said at least one fusible link located outside said hose assembly, wherein the fusing of the fusible link activates said fire extinguisher.

(14) The system of (11), further comprising: a supplemental check valve disposed inside of at least one of the hose assembly and the second terminal assembly.

(15) The system of (14), further comprising: said at least one fusible link located outside said hose assembly, wherein the fusing of the fusible link activates said supplemental check valve.

(16) The system of (11), further comprising: at least one of a check valve disposed inside at least one of the first terminal assembly, the hose assembly, and the second terminal assembly.

(17) The system of (11), wherein said hose assembly is disposed inside of a gas appliance.

(18) The system of (11), wherein said hose assembly is providing a flammable substance to a gas appliance.

(19) The system of (11), further comprising: a computer processor for monitoring the operating status of the at least one fire extinguisher.

(20) The system of (19), wherein the computer processor is programmed to at least one of alert emergency response personnel of fire, activate fire alarms, activate sprinklers, provide mobile alerts to designated parties if the status of said fire extinguisher changes to release fire suppressant, and provide said mobile alerts to said designated parties if the status of said check valve changes.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims.

The invention claimed is:

1. A gas pipe terminal assembly for minimization of fire hazards associated with conductance of a flammable substance, comprising:
   a pipe having a flange at each end of the pipe;
   each flange having at least one of a check valve and a flame screen mounted in an interior of the flange to control a gas flow therethrough;
   each flange having wire guide holes and set screw holes within an outside diameter of the pipe;
   at least one wire segment in tension inside said pipe and connected to at least one fusible link; and
   said at least one fusible link configured to fuse upon exposure to a temperature above 100° C. and thereby release said tension and activate at least one fire suppression device.

2. The apparatus of claim 1, wherein
   said at least one fusible link is located inside said pipe, and wherein
   the fusing of the at least one fusible link activates said check valve as said at least one fire suppression device.

3. The apparatus of claim 1, further comprising:
   a fire extinguisher connected to the inside of said pipe; and
   wherein
      said at least one fusible link is located inside said pipe, and
      the fusing of the at least one fusible link activates the fire extinguisher as the at least one fire suppression device.

4. The apparatus of claim 3,
   wherein the fusing of the at least one fusible link activates at least one of said check valve and said fire extinguisher.

5. The apparatus of claim 4, wherein the at least one fusible link comprises plural fusible links and the fusible links have equal melting temperatures.

6. The apparatus of claim 4, wherein the at least one fusible link comprises plural fusible links and the fusible links have different melting temperatures.

7. The apparatus of claim 1, wherein
   said at least one fusible link is located inside said pipe, and
   the fusing of the at least one fusible link activates at least one of said check valve and a fire extinguisher disposed outside the pipe.

8. The apparatus of claim 1, further comprising:
   a plurality of wire segments,
   wire clamps securing the wire segments to each other, and
   set screws securing the wire segments to at least one of the flanges.

9. The apparatus of claim 1, further comprising:
   a plurality of wire segments, and
   wire guide caps sealing the wire guide holes or sealing wire segments passing therethrough.

10. The apparatus of claim 1, wherein the at least one fusible link comprises at least one of brass, bronze, and stainless steel alloys.

11. A system for suppression of fire hazards associated with conductance of a flammable substance, comprising:
    a first terminal assembly comprising the gas pipe terminal assembly of claim 1;
    a hose assembly connected to said first terminal assembly;
    a second terminal assembly connected to said hose assembly; and
    a fire extinguisher disposed in a vicinity of at least one of the first terminal assembly, the hose assembly, and the second terminal assembly.

12. The system of claim 11, wherein
    said at least one fusible link is located outside said hose assembly, and
    the fusing of the at least one fusible link activates said check valve.

13. The system of claim 11, wherein
    said at least one fusible link is located outside said hose assembly, and
    the fusing of the at least one fusible link activates said fire extinguisher.

14. The system of claim 11, further comprising:
    a supplemental check valve disposed inside of at least one of the hose assembly and the second terminal assembly.

15. The system of claim 14, wherein
    said at least one fusible link is located outside said hose assembly, and
    the fusing of the at least one fusible link activates said supplemental check valve.

16. The system of claim 11,
    wherein each check valve is disposed inside at least one of the first terminal assembly, the hose assembly, and the second terminal assembly.

17. The system of claim 11, wherein said hose assembly is disposed inside of a gas appliance.

18. The system of claim 11, wherein said hose assembly is providing a flammable substance to a gas appliance.

19. The system of claim 11, further comprising:
    a computer processor for monitoring the operating status of the fire extinguisher.

20. The system of claim 19, wherein the computer processor is programmed to at least one of alert emergency response personnel of fire, activate fire alarms, activate sprinklers, provide mobile alerts to designated parties if the status of said fire extinguisher changes to release fire suppressant, and provide said mobile alerts to said designated parties if the status of said check valve changes.

* * * * *